United States Patent
Wang et al.

(10) Patent No.: US 12,057,592 B2
(45) Date of Patent: Aug. 6, 2024

(54) BATTERY EXPANSION CONTROL SYSTEM

(71) Applicant: Google LLC, Mountain View, CA (US)

(72) Inventors: David Wang, San Jose, CA (US); Lauren Francine Chanen, San Francisco, CA (US); James Robert Lim, Mountain View, CA (US); Neha Ravi Dixit, Santa Clara, CA (US); Alexander P. Wroblewski, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 473 days.

(21) Appl. No.: 17/032,685

(22) Filed: Sep. 25, 2020

(65) Prior Publication Data

US 2022/0102691 A1 Mar. 31, 2022

(51) Int. Cl.
  *H01M 50/209* (2021.01)
  *H01M 50/105* (2021.01)
  *H01M 50/138* (2021.01)

(52) U.S. Cl.
  CPC ....... *H01M 50/209* (2021.01); *H01M 50/105* (2021.01); *H01M 50/138* (2021.01)

(58) Field of Classification Search
  None
  See application file for complete search history.

(56) References Cited

U.S. PATENT DOCUMENTS 8,168,317 B2 * 5/2012 Yoon ................... H01M 10/482
                                                429/153
8,896,271 B2   11/2014 Kim et al.

(Continued)

FOREIGN PATENT DOCUMENTS

CN     204760501     11/2015
CN     105807230     3/2019
(Continued)

OTHER PUBLICATIONS

X. Zhang et al., "A Fully Integrated Battery-Powered System-on-Chip in 40-nm CMOS for Closed-Loop Control of Insect-Scale Pico-Aerial Vehicle," in IEEE Journal of Solid-State Circuits, vol. 52, No. 9, pp. 2374-2387, Sep. 2017, doi: 10.1109/JSSC.2017.2705170 (Year: 2017).*

(Continued)

*Primary Examiner* — Matthew T Martin
*Assistant Examiner* — Krishna R Hammond
(74) *Attorney, Agent, or Firm* — Colby Nipper PLLC

(57) ABSTRACT

A battery pack includes a battery, an outer enclosure housing the battery to form a battery pack, and an expandable portion extending from the outer enclosure and allowing the battery pack to expand along an X-axis of the battery pack. The expandable portion includes an inner portion, an outer portion, and a gap portion between the inner portion and the outer portion. The inner portion and the outer portion have a sealing layer to seal off an interior space and the gap portion is devoid of the sealing layer. The sealing layer allows for fluid communication between the gap portion and the interior space when a pressure exerted on the sealing layer exceeds a pressure threshold. The expandable portion includes folds allowing the expandable portion to fold toward the battery pack in an initial folded configuration and expand away from the battery pack in an at least partially unfolded configuration.

20 Claims, 11 Drawing Sheets

(56) References Cited

U.S. PATENT DOCUMENTS

| | | |
|---|---|---|
| 9,768,429 B2 | 9/2017 | Chung et al. |
| 10,044,080 B2 | 8/2018 | Kim et al. |
| 10,347,877 B2 | 7/2019 | Douke et al. |
| 11,668,756 B2 | 6/2023 | Wang et al. |
| 11,680,918 B2 | 6/2023 | Wang et al. |
| 2002/0160245 A1* | 10/2002 | Genc .................. H01M 8/1007 137/197 |
| 2006/0292436 A1 | 12/2006 | Cook et al. |
| 2011/0210703 A1 | 9/2011 | Souza et al. |
| 2013/0004811 A1 | 1/2013 | Banerjee et al. |
| 2014/0099527 A1 | 4/2014 | Seong et al. |
| 2014/0269811 A1 | 9/2014 | Maleki et al. |
| 2014/0285155 A1 | 9/2014 | Choi |
| 2015/0144614 A1 | 5/2015 | Kim et al. |
| 2016/0322676 A1 | 11/2016 | Jun et al. |
| 2016/0336562 A1* | 11/2016 | Oh ...................... H01M 50/247 |
| 2017/0187081 A1 | 6/2017 | Kim et al. |
| 2019/0001828 A1 | 1/2019 | Ko et al. |
| 2020/0313152 A1 | 10/2020 | Stefanopoulou et al. |
| 2022/0099606 A1 | 3/2022 | Wang et al. |
| 2022/0099749 A1 | 3/2022 | Wang et al. |
| 2023/0304951 A1 | 9/2023 | Wang et al. |

FOREIGN PATENT DOCUMENTS

| | | | |
|---|---|---|---|
| CN | 110612620 A * | 12/2019 | ........ H01M 10/0525 |
| CN | 111624502 | 9/2020 | |
| JP | 2016177941 | 10/2016 | |
| KR | 101926341 | 3/2019 | |
| KR | 20220081583 | 6/2022 | |
| WO | WO-2012114162 A1 * | 8/2012 | ............ H01M 10/52 |
| WO | 2014156869 | 10/2014 | |

OTHER PUBLICATIONS

Tessier, et al., "Real-Time Estimator Li-ion Cells Internal Resistance for Electric Vehicle Application", Jun. 2016, 12 pages.

"Non-Final Office Action", U.S. Appl. No. 17/032,668, filed Aug. 2, 2022, 27 pages.

"Non-Final Office Action", U.S. Appl. No. 17/032,679, filed Oct. 27, 2022, 7 pages.

"Restriction Requirement", U.S. Appl. No. 17/032,679, filed Aug. 26, 2022, 6 pages.

"Notice of Allowance", U.S. Appl. No. 17/032,668, filed Feb. 1, 2023, 9 pages.

"Notice of Allowance", U.S. Appl. No. 17/032,679, filed Feb. 15, 2023, 9 pages.

"Non-Final Office Action", U.S. Appl. No. 18/312,477, filed Jan. 24, 2024, 17 pages.

"Notice of Allowance", U.S. Appl. No. 18/312,477, Apr. 29, 2024, 8 pages.

* cited by examiner

BATTERY EXPANSION CONTROL SYSTEM

CROSS REFERENCE TO RELATED APPLICATIONS

This application is related to U.S. patent application Ser. No. 17/032,668, filed Sep. 25, 2020, entitled "Battery Degradation Monitoring System and Methods," and U.S. patent application Ser. No. 17/032,679, filed Sep. 25, 2020, entitled "Thermal Gradient Battery Monitoring System and Methods," each of which is hereby incorporated by reference in its entirety.

TECHNICAL FIELD

The present invention relates to a battery expansion control system for use in a battery, specifically, a battery swelling directional control system.

BACKGROUND

Battery powered electronic devices are sometimes exposed to high temperatures causing excessive battery heating and accelerated battery swell from electrolyte decomposition and gas generation. As the battery swells, the internal pressure of the cells of the battery continue to increase until the electrolyte is consumed and the battery reaches peak thickness, or a seal of a pouch holding the battery breaks open to allow the internal gas to vent and the electrolyte to vaporize. In some instances, if the cell pouch seal is able to withstand high pressure, as is typical for cells designed for longevity, the battery enclosure may break open to accommodate the battery expansion.

In electronic devices, the thickness of the battery allows the electronic device to maintain its thin design and profile. When a battery begins to swell or expend, the thickness of the electronic device may increase or the electronic device may crack, break, or rupture due to the battery swelling. Traditionally, a battery swells along its Z-axis such that its thickness increases. A battery swelling along the Z-axis results in breaking and cracking of electronic devices and/or results in increased thickness of the electronic device.

BRIEF SUMMARY OF THE INVENTION

Implementations of the present invention are directed to a battery pack including a battery, an outer enclosure housing the battery to form a battery pack, and an expandable portion extending from the outer enclosure and allowing the battery pack to expand along an X-axis of the battery pack, the expandable portion having an inner portion, an outer portion, and a gap portion disposed between the inner portion and the outer portion, the inner portion and the outer portion having a sealing layer to seal off an interior space and the gap portion being devoid of the sealing layer, the sealing layer allowing for fluid communication between the gap portion and the interior space when a pressure exerted on the sealing layer exceeds a pressure threshold, wherein the expandable portion includes one or more folds allowing the expandable portion to fold toward the battery pack in an initial folded configuration and expand away from the battery pack in an at least partially unfolded configuration.

In some implementations, the interior space is a space between the battery and the enclosure.

In some implementations, the pressure threshold is less than 1000 kPa.

In some implementations, a thickness of the sealing layer is less than a thickness of the expandable portion. A length of the gap portion may be greater than a length of the inner portion.

In some implementations, inner portion includes a notch, an aperture, and/or an oleophobic mesh. The inner portion may be disposed between the gap portion and the battery.

In some implementations, the expandable portion folds to form an "N" shape.

In some implementations, the outer enclosure and the expandable portion are comprised of a plurality of layers, the plurality of layers including one or more of a nylon layer, an aluminum layer, a polypropylene layer, and a thermoplastic layer.

Another implementation of the present invention is directed to a battery pack including an enclosure, and a battery disposed within the enclosure, the enclosure having an expandable portion including an inner portion, an outer portion, and a gap portion disposed between the inner portion and the outer portion, the inner portion and the outer portion having a sealing layer to seal off an interior space and the gap portion being devoid of the sealing layer, wherein the expandable portion expands in a predetermined direction to direct swelling of the enclosure upon degradation of the battery.

In some implementations, the sealing layer allows for fluid communication between the gap portion and the interior space when a pressure exerted on the sealing layer exceeds a pressure threshold.

In some implementations, expandable portion extends from the enclosure. The expandable portion may include one or more folds allowing the expandable portion to fold toward the battery and expand away from the battery.

In some implementations, the predetermined direction is along an X-axis of the battery.

In some implementations, the inner portion is disposed between the gap portion and the battery.

Another implementation of the present invention is directed to an electronic device including a processor, a battery coupled to the processor and disposed within an enclosure of the electronic device, an outer enclosure housing the battery to form a battery pack, and an expandable portion extending from the outer enclosure and allowing the battery pack to expand along an X-axis of the battery pack, the expandable portion having an inner portion, an outer portion, and a gap portion disposed between the inner portion and the outer portion, the inner portion and the outer portion having a sealing layer to seal off an interior space and the gap portion being devoid of the sealing layer, the sealing layer allowing for fluid communication between the gap portion and the interior space when a pressure exerted on the sealing layer exceeds a pressure threshold, wherein the expandable portion includes one or more folds allowing the expandable portion to fold toward the battery pack in an initial folded configuration and expand away from the battery pack in an at least partially unfolded configuration.

In some implementations, the enclosure includes a target area sized and shaped to house the expandable portion in the unfolded configuration.

In some implementations, the processor is a system on a chip (SoC).

BRIEF DESCRIPTION OF THE DRAWINGS

For a better understanding of the various implementations described and shown herein, reference should be made to the Detailed Description of implementations below, in conjunction with the following drawings in which like reference numerals refer to corresponding parts throughout the figures.

DETAILED DESCRIPTION OF THE EXEMPLARY IMPLEMENTATIONS OF THE INVENTION

Figure 1:
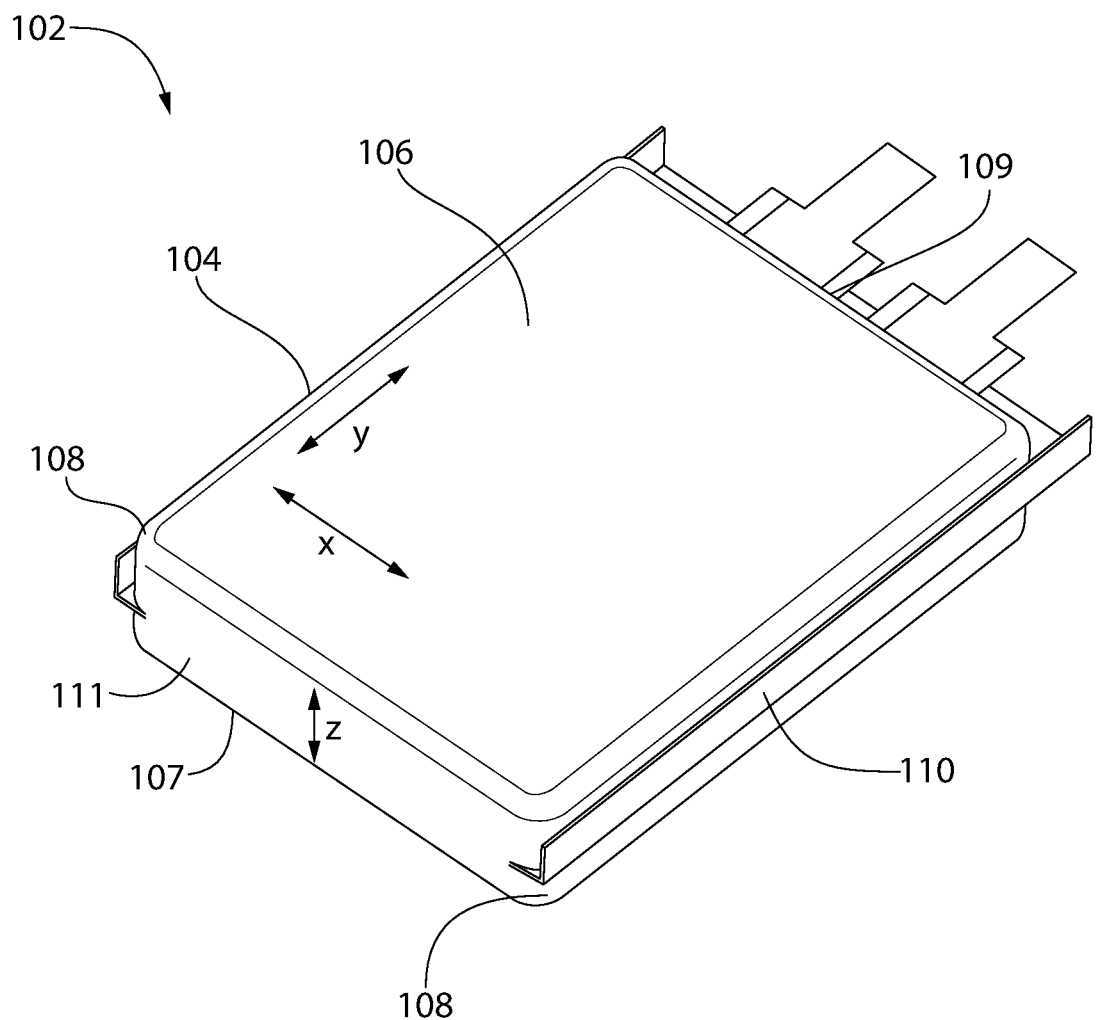
FIG. 1 is a top perspective view of a battery pack in accordance with some implementations of the present invention.
Figure 2A:
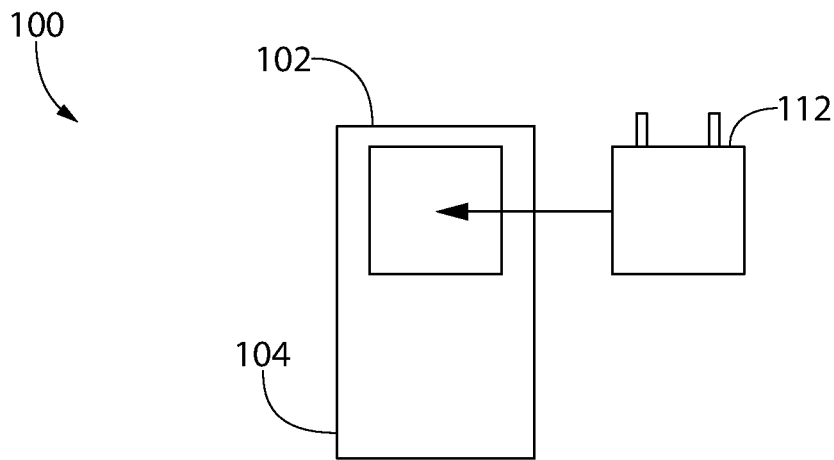
FIGS. 2A-2C are illustrations of a battery expansion control system with battery pack in accordance with some implementations of the present invention.
Figure 2B:
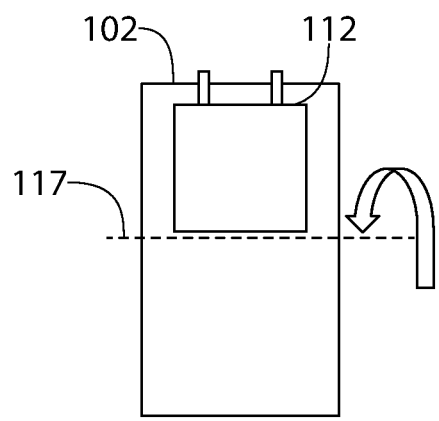
Figure 2C:
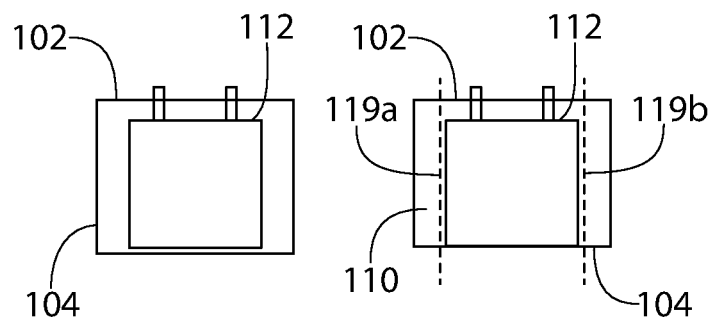

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Referring to the drawings in detail, wherein like reference numerals indicate like elements throughout, there is shown in FIGS. 1-11D battery expansion control system 100, which may include a battery stored within an enclosure of an electronic device. In some implementations, battery 112 is stored in battery pack 102. Battery pack 102 may include a pouch comprised of a plurality of layers and may be configured to have an airtight seal around battery 112. Battery 112 may be similar to a standard re-chargeable battery. Battery 112 may be an embedded battery or a removable battery. In some implementations, battery 112 is a non-removable battery. Battery 112 may be disposed within battery pack 102 and may be comprised of a jelly-roll structure. Battery 112, i.e. the jelly-roll structure, may be comprised of anode and cathode sheets, each separated by a separator. For example, the jelly roll structure may be comprised of an anode-separator-cathode configuration, which is rolled and inserted into the cell pouch. In some implementations, electrolyte is injected into the pouch. The electrolyte serves as a conductive means for ions to move from the cathode to anode when battery 112 is charging, and move from the anode to the cathode when battery 112 is discharging.

Battery 112 may degrade over time resulting in battery pack 102 swelling. For example, over time the electrolyte within battery 112 may degrade releasing gases such as, carbon dioxide or carbon monoxide. The gas generated by battery 112 within battery pack 102 may cause battery pack 102 to swell and expand due to battery pack 102 creating an airtight seal around battery 112. In some implementations, without intervention, battery pack 102 may swell and expand, which may cause damage to enclosure 130 or surrounding areas.

Referring to FIGS. 1 and 4-5B, battery expansion control system 100 may include battery pack 102, which may include battery 112 and outer enclosure 104. During manufacturing of battery pack 102, outer enclosure 104 may include a cup shape punched into outer enclosure 104 in which battery 112 is disposed. Outer enclosure 104 may include side seal 110, which may extend from outer enclosure 104 and may extend away from battery pack 102. For example, battery 112 may be inserted into outer enclosure 104 and side seal 110 may be formed from the excess material of outer enclosure 104 when outer enclosure 104 is sealed around battery 112. In some implementations, side seal 110 extends approximately 3 mm from outer enclosure 104. However, side seal 110 may extend less than approximately 3 mm or greater than approximately 3 mm from outer enclosure 104. For example, side seal 110 may extend approximately 1 mm, approximately 2 mm, approximately 4 mm, approximately 5 mm, greater than approximately 5 mm, or less than approximately 1 mm. In some implementations, outer enclosure 104 includes control seal 200, which may be an expandable portion of outer enclosure 104.

In some implementations, battery pack 102 is disposed in enclosure 130, which may be an enclosure of an electronic device. In some implementations, battery pack 102 is disposed within an electronic device configured for outdoor use. For example, battery pack 102 may be disposed within an outdoor doorbell, outdoor security camera, outdoor motion sensor, outdoor smart device, automobile devices or any other electronic device. However, battery pack 102 may be disposed within an electronic device configured for indoor use. For example, battery pack 102 may be used inside of a warehouse with devices and systems that are thermally warm. In some implementations, battery pack 102 is configured to be discharged for short pulses. For example, battery pack 102 may be stored within an electronic device of an outdoor doorbell and may only discharge for short pulses during events such as doorbell rings and motion detection. Battery pack 102 may be charged back up to full capacity by, for example, trickle charging to allow battery pack 102 to remain at full charge.

Referring to FIGS. 1-2C and 5A-5B, battery pack 102 may include battery 112, interior space 114 and outer enclosure 104. Outer enclosure 104 may include top surface 106, bottom surface 107, side walls 108, top seal 109, and bottom fold 111. Bottom fold 111 may result from folding outer enclosure 104 at fold line 117. Battery pack 102 may include battery 112 stored within outer enclosure 104, and interior space 114, which may be the space between battery 112 and outer enclosure 104. In some implementations, outer enclosure 104 is comprised of a flexible material to surround battery 112. For example, outer enclosure 104 may be a bag or pouch and may be sealed around battery 112. During packaging of battery pack 102, battery 112 may be disposed on top of an unfolded outer enclosure 104, which may be unfolded to encompass an area larger than battery 112. Outer enclosure 104 may be folded along fold line 117 to cover the entirety of battery 112 and folded on the sides along fold lines 119a and 119b. Outer enclosure 104 may then be sealed along its edges to create an airtight seal around battery 112. For example, outer enclosure 104 may be sealed along top seal 109, bottom fold 111, and side seals 110 adjacent side walls 108. Side seal 110 may be formed by the excess material of outer enclosure 104 during sealing around battery 112. In some implementations, side seal 110 extends from side walls 108. However, side seal 110 may extend from top surface 106 or bottom surface 107. Side seal 110 may extend from side wall 108 and may be folded to abut side wall 108 to reduce the width and overall size of battery pack 102.

In some implementations, battery 112 of battery pack 102 degrades over time resulting in battery pack 102 being in a swollen state due to gases being released by battery 112 into battery pack 102. The gases may be sealed within battery pack 102 resulting in outer enclosure 104 swelling and expanding. For example, when battery 112 degrades and releases gas, the gas may accumulate within interior space 114 increasing the size of interior space 114 and thereby increasing the distance between outer enclosure 104 and battery 112. As battery 112 continues to degrade, more gas is released, causing the swelling and expansion of interior space 114 and outer enclosure 104 to increase. In some implementations, outer enclosure 104 swelling results in top surface 106, bottom surface 107, and side walls 108 bulging outward. In some implementations, interior space 114 is sized to allow for some accumulation of gas released by battery 112 without increasing in size. For example, interior space 114 may be configured to allow battery 112 to expand by between approximately 1% to 25%, 5% to 20%, or 10% to 15% prior to interior space 114 increasing in size. In some implementations, interior space 114 is configured to allow battery 112 to expand approximately 12% without interior space 114 increasing in size.

Figure 3A:
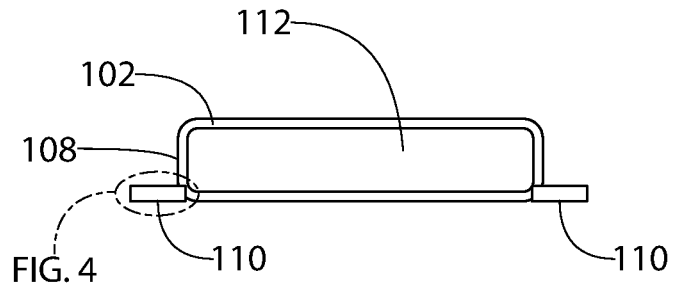
FIGS. 3A-3B are side views of the battery pack of FIG. 2.
Figure 3B:
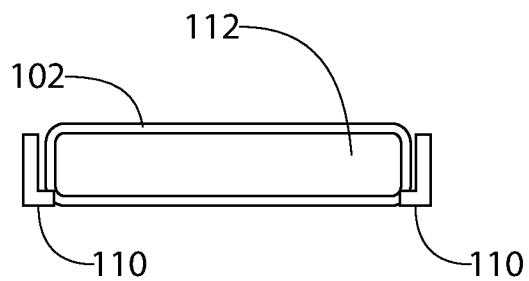
Figure 4:
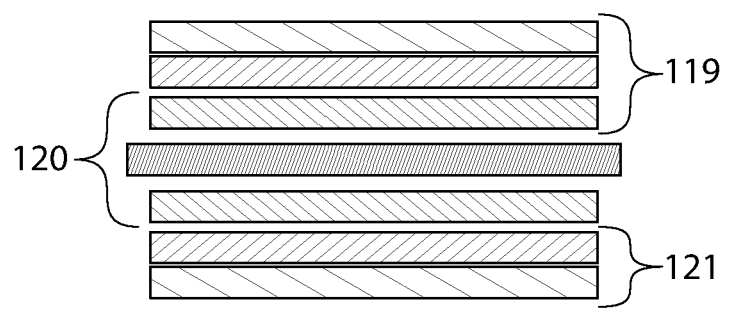
FIG. 4 is a zoomed in view of a side seal of the battery pack of FIG. 3A.

Referring to FIGS. 3A-3B and 4, side seal 110 may extend from outer enclosure 104 and may be formed by folding two halves of outer enclosure 104 together. Outer enclosure 104 may be comprised of a plurality of layers. For example, outer enclosure 104 may be comprised of three layers. However, outer enclosure 104 may be comprised of one layer, two layers, four layers, five layers, or six layers. In some implementations, outer enclosure 104 is comprised of an outer layer, a middle layer, and an inner layer. The middle layer may be disposed between the outer layer and the inner layer. In some implementations, the outer layer is nylon, the middle layer is aluminum, and the inner layer is a polypropylene (PP). When outer enclosure 104 is folded over battery 112, the inner layer of the top half and bottom half of outer enclosure 104 may be coupled together. For example, the inner layer of the top half and the bottom half of outer enclosure 104 may be melted together to create a thermoplastic seal comprised of the PP layers. Since side seal 110 is an extension of outer enclosure 104, side seal 110 may comprised of a plurality of layers with the innermost layer being the thermoplastic sealing layer comprised of PP layers coupled together. The innermost layers of PP may be coupled together via melting, an adhesive, or any other method desired.

In some implementations, side seal 110 is comprised of a plurality of layers including top layers 119, sealing layer 120, and bottom layers 121 formed by coupling the two halves of outer enclosure 104 together. Top layers 119 and bottom layers 121 may include one or more layers of nylon, aluminum, or PP. However, side seal 110 may be comprised of a plurality of layers made of different materials in a different arrangement. In some implementations, top layers 119 includes an outermost layer of nylon and an inner layer of aluminum, and bottom layers 121 includes an outermost layer of nylon and an inner layer of aluminum. Sealing layer 120 may be disposed between top layers 119 and bottom layers 121, and be comprised of one or more layers of PP coupled together to form a thermoplastic seal. In some implementations, the nylon layer is for providing protection to battery 112 and battery pack 102, the layer of aluminum is to prevent moisture ingress, and the layer of PP is used as a thermoplastic seal to encapsulate battery 112 after sealing outer enclosure 104 around battery 112.

In some implementations, sealing layer 120 of side seal 110 is configured to remain coupled together when a pressure is exerted against it, thereby ensuring battery pack 102 remains sealed. For example, battery pack 102 may begin to swell, thereby exerting a pressure on sealing layer 120, since that is the coupling point where the top half and bottom half of outer enclosure 104 are coupled together. Due to the strength of sealing layer 120, side seal 110 may not rupture resulting in top surface 106 and bottom surface 107 of outer enclosure 104 expanding outwardly along the Z-axis of battery pack 102 as battery pack 102 begins to swell.

Figure 5A:
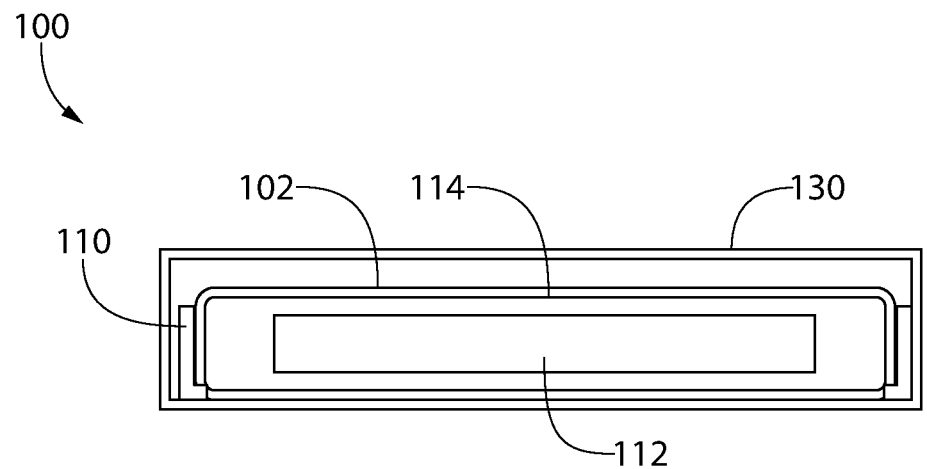
FIG. 5A is a side view of a battery in a baseline state in accordance with some implementations of the present invention.
Figure 5B:
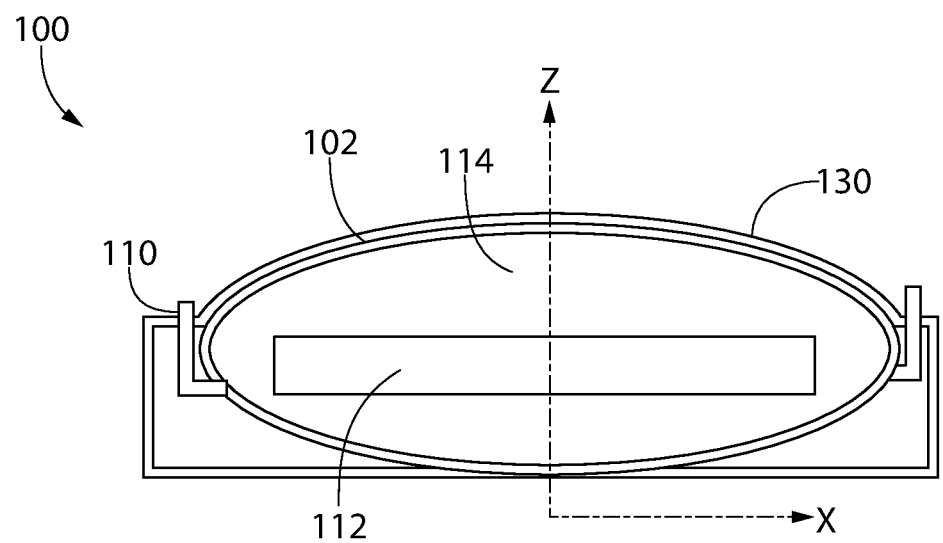
FIG. 5B is a side view of a battery in a swollen state in accordance with some implementations of the present invention.

Referring to FIGS. 5A and 5B, battery 112 and battery pack 102 may be disposed within enclosure 130. Enclosure 130 may be a battery enclosure of an electronic device. In some implementations, enclosure 130 is a casing to provide housing for battery pack 102 and battery 112. For example, battery pack 102 may be disposed within enclosure 130, and enclosure 130 may be configured to be inserted and removed from an electronic device. In some implementations, enclosure 130 is portion of an electronic device configured to receive battery pack 102. Enclosure 130 may be configured to surround battery pack 102 such that if battery pack 102 begins to swell and expand, battery pack 102 would begin to contact and abut enclosure 130.

Referring to FIG. 5A, battery 112 and battery pack 102 may include a baseline state where battery pack 102 is not swollen or expanded. For example, at the baseline state, the distance between battery 112 and outer enclosure 104 may be minimal. Referring to FIG. 5B, when battery 112 has begun to degrade, battery pack 102 may be in a swollen and expanded state. Battery pack 102 may swell and expand due to the degradation of battery 112, which results in the release of gas. Upon degradation of battery 112, the gas released by battery 112 is confined to battery pack 102 due to outer enclosure 104 being sealed around battery 112. Battery pack 102 may expand through enclosure 130, resulting in damage to the electronic device housing battery pack 102, and the surrounding area. When battery pack 102 begins to swell and expand, the gas released by battery 112 may accumulate within interior space 114 of outer enclosure 104. Accumulation of gases within battery pack 102 may result in battery pack 102 expanding along the Z-axis of battery pack 102 due to the strength of side seal 110. The strength of side seal 110 prevents the gas produced by battery 112 degrading from escaping battery pack 102. The confined gas accumulates within battery pack 102 and results in the expansion of interior space 114, thereby expanding battery pack 102.

In some implementations, side seal 110 has a pressure threshold at which side seal 110 may rupture or break open. For example, side seal 110 may have a pressure threshold greater than 1,000 kPa or less than 1,000 kPa. For example, side seal 110 may have a pressure threshold of at least 100 kPa, at least 500 kPa, at least 750 kPa, at least 1,500 kPa, or at least 2,000 kPa. In some implementations, changing the length of side seal 110 affects the pressure threshold of side seal 110. For example, increasing the length of side seal 110 may increase the pressure threshold of side seal 110.

In some implementations, the swelling of battery pack 102 begins to exert a force on enclosure 130. Enclosure 130 may have a pressure threshold, which is the pressure that enclosure 130 is able to withstand before breaking or rupturing. For example, enclosure 130 may have a pressure threshold of 1,000 kPa and battery pack 102 may swell and expand to exert a pressure on enclosure 130 at a pressure greater than 1,000 kPa, resulting in enclosure 130 breaking or rupturing. In implementations, battery pack 102 swelling and expanding may exert a force on enclosure 130 less than the pressure threshold of enclosure 130 resulting in enclosure 130 bending, but not breaking or rupturing. Enclosure 130 may have a pressure threshold greater than 1,000 kPa or less than 1,000 kPa. For example, enclosure 130 may have a pressure threshold of at least 100 kPa, 500 kPa, 750 kPa, 1,500 kPa, or 2,000 kPa.

Figure 6A:
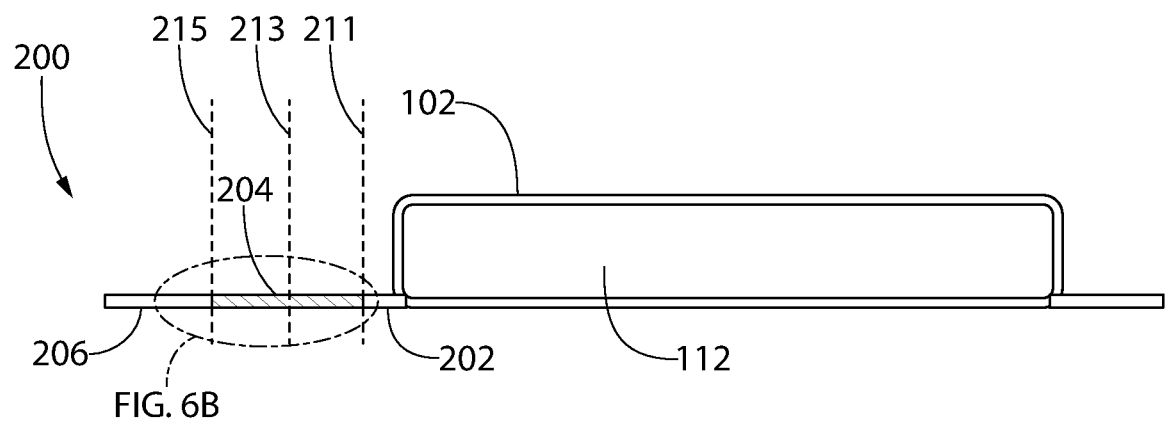
FIG. 6A is a side view of a battery pack in accordance with some implementations of the present invention.
Figure 6B:
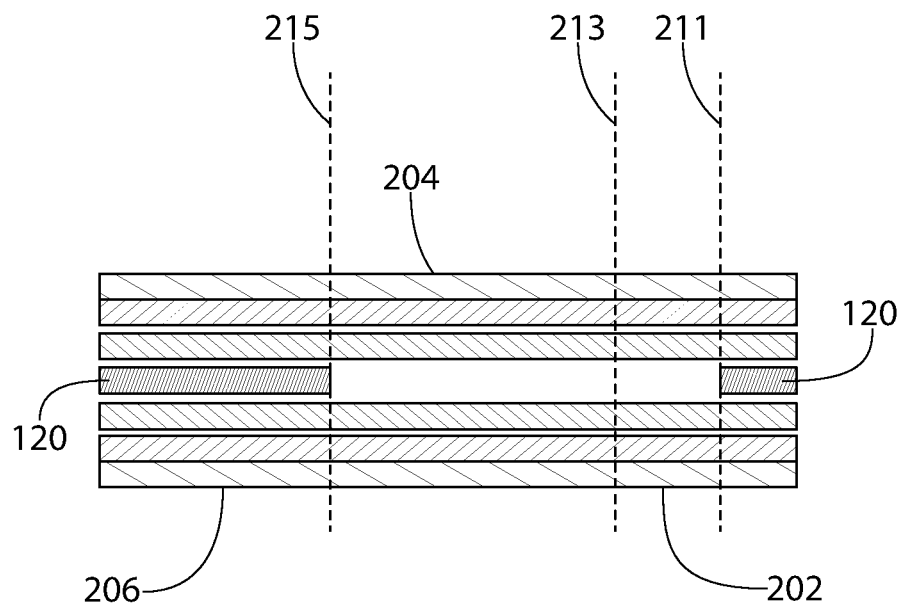
FIG. 6B is a zoomed in view of the battery pack of FIG. 5A.

Referring to FIGS. 6A and 6B, battery expansion control system 100 may include control seal 200. Control seal 200 may be an expandable portion of outer enclosure 104 configured to expand first when battery pack 102 begins to fill with gas. For example, when battery 112 begins to degrade and release gas, the pressure of the gas on control seal 200 may allow control seal 200 to expand outward and away from battery pack 102 such that battery pack 102 expands along the X-axis. For example, control seal 200 may allow battery pack 102 to expand along the X-axis of battery 112 and/or battery pack 102 prior to, during, or after battery pack 102 expanding along the Z-axis. In some implementations, control seal 200 is configured to expand in a pre-determined direction and/or configured to expand primarily in a single direction. For example, control seal 200 may be configured to expand primarily along the X-axis of battery pack 102.

Control seal 200 may be similar to side seal 110, except control seal 200 may include gap portion 204. Control seal 200 may extend from outer enclosure 104 and may allow battery pack 102 to expand in a predetermined direction. For example, control seal 200 may fold and unfold along the X-axis of battery pack 102 and/or battery 112, to allow battery pack 102 to expand along the X-axis of battery pack 102 and/or battery 112. In some implementations, gap portion 204 is disposed between inner portion 202 and outer portion 206. Gap portion 204 may be separated from inner portion 202 by fold line 211 and gap portion 204 may be separated from outer portion 206 by fold line 215. In some implementations, gap portion 204 includes fold line 213 which may divide gap portion 204 into two sections and may be disposed between fold lines 215 and 211. Fold line 213 may be configured to allow gap portion 204 to fold such that a portion of gap portion 204 is disposed adjacent to inner portion 202 when gap portion 204 is folded.

In a preferred implementation, inner portion 202 and outer portion 206 may both be identical to side seal 110. Inner portion 202 and outer portion 206 may each include sealing layer 120. In some implementations, inner portion 202 has a length less than gap portion 204 and outer portion 206 such that the pressure required to break sealing layer 120 of inner portion 202 is less than the pressure required to rupture enclosure 130 or sealing layer 120 of outer portion 206. For example, the pressure threshold of sealing layer 120 of inner portion 202 may be 100 kPa, less than 100 kPa, or less than 500 kPa. In some implementations, outer portion 206 has a length greater than gap portion 204 and inner portion 202 such that the pressure required to break sealing layer 120 of outer portion 206 is greater than the pressure required to rupture or break sealing layer 120 of inner portion 202. For example, the pressure threshold of sealing layer 120 of outer portion 206 may be 1,000 kPa, greater than 500 kPa, or greater than 1,000 kPa.

Figure 7A:
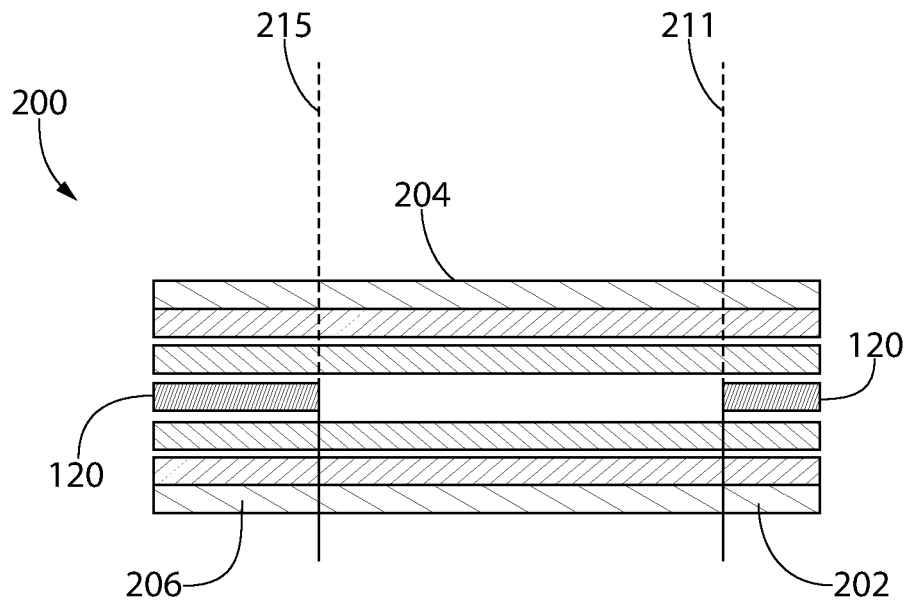
FIG. 7A is a zoomed in view of a control seal when the battery is in a baseline state in accordance with some implementations of the present invention.
Figure 7B:
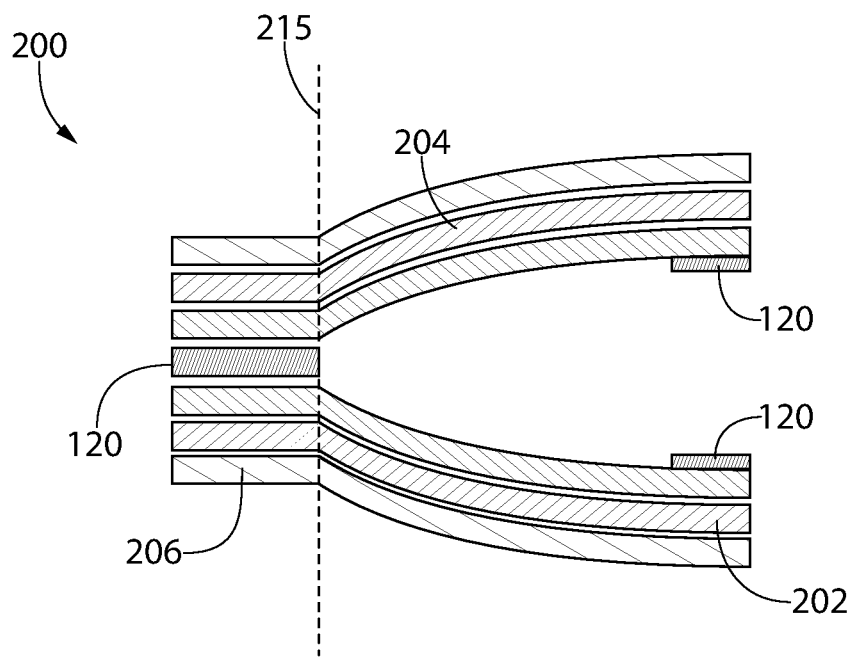
FIG. 7B is a zoomed in view of a control seal when the battery is in a swollen state in accordance with some implementations of the present invention.

Referring to FIGS. 7A and 7B, gap portion 204 may not include sealing layer 120. Gap portion 204 not including sealing layer 120 allows for gap portion 204 to be in communication with interior space 114 of battery pack 102 when sealing layer 120 of inner portion 202 breaks or ruptures, as shown in FIG. 7B. For example, battery pack 102 may begin to expand and swell resulting in pressure being applied to sealing layer 120 of inner portion 202. Since sealing layer 120 of inner portion 202 has a pressure threshold less than the pressure threshold of enclosure 130, sealing layer 120 of inner portion 202 may split or break open due to the gas within battery pack 102 exerting a pressure higher than the pressure threshold of sealing layer 120 of inner portion 202. Upon sealing layer 120 of inner portion 202 splitting and breaking, the gas from interior space 114 of battery pack 102 may flow into gap portion 204, allowing gap portion 204 to expand. The flow of gas from interior space 114 to gap portion 204 via inner portion 202 allows for battery pack 102 to expand along its X-axis, instead of its Z-axis.

In some implementations, when sealing layer 120 of inner portion 202 breaks, gas flows into gap portion 204 and remain with gap portion 204 due to sealing layer 120 of outer portion 206 maintaining the seal of battery pack 102. For example, outer portion 206 may have a length greater than inner portion 202 such that sealing layer 120 of outer portion 206 has a pressure threshold greater than inner portion 202. Outer portion 206 having a pressure threshold greater than inner portion 202 allows sealing layer 120 of outer portion 206 to maintain a seal around battery 112 when sealing layer 120 of inner portion 202 fails. This allows any buildup of gas within battery pack 102 to flow into gap portion 204, thereby allowing battery pack 102 to expand along its X-axis only.

Figure 8:
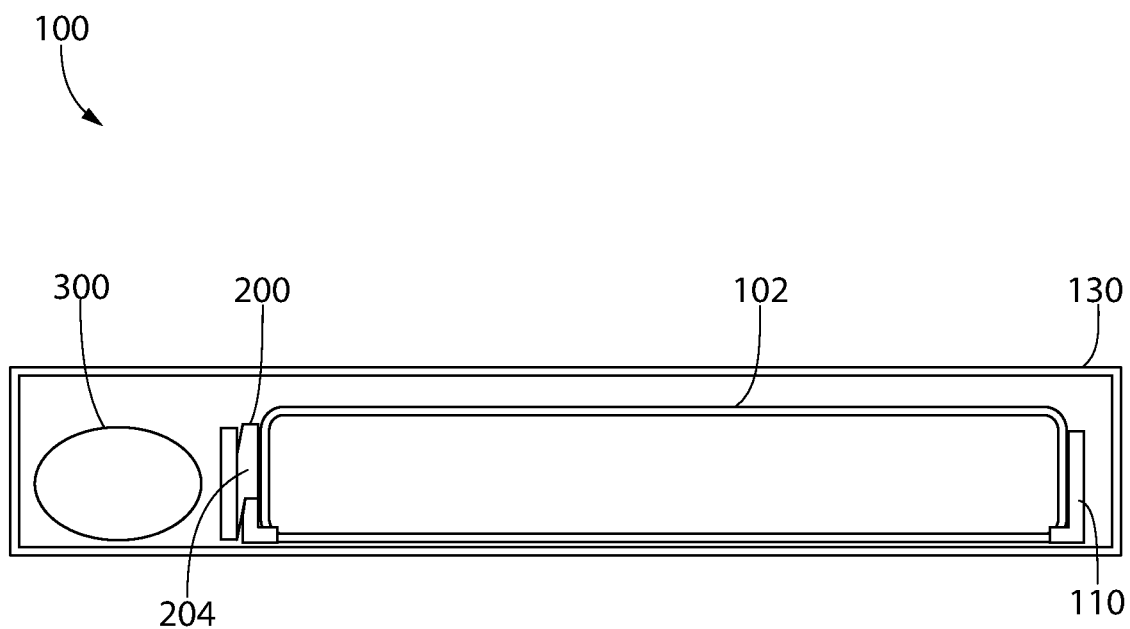
FIG. 8 is a side view of a battery in a baseline state with a control seal in accordance with some implementations of the present invention.
Figure 9:
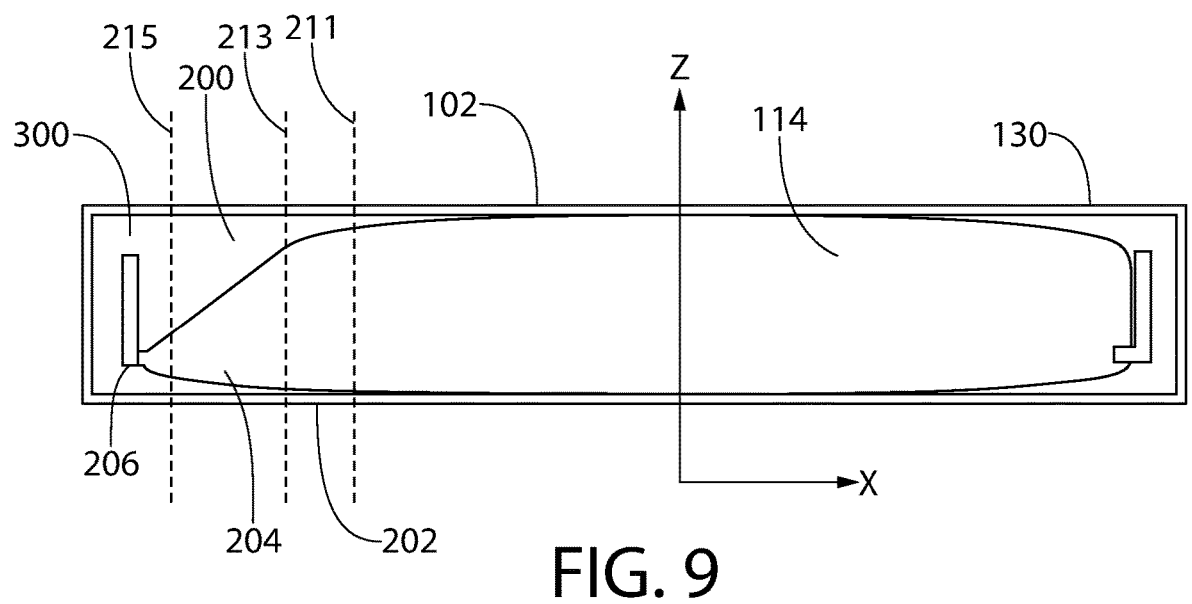
FIG. 9 is a side view of a battery in a swollen state with a control seal in accordance with some implementations of the present invention.

Referring to FIGS. 8 and 9, control seal 200 may be configured to fold. For example, control seal 200 may fold adjacent to side wall 108 of battery pack 102 (FIG. 8) such that when sealing layer 120 of inner portion 202 fails and gas flows into and expands gap portion 204, control seal 200 begins to unfold. Folding of control seal 200 assists in reducing the overall profile of battery pack 102 and reduces the width of battery pack 102. In some implementations, control seal 200 is configured to fold into an "N" shape such that control seal 200 can easily expand away from battery 112 and battery pack 102 upon gap portion 204 filling with gas. For example, control seal 200 may be folded along fold lines 215, 213, and/or 211 such that control seal 200 is folded into an "N" shape. In some implementation, enclosure 130 may include target area 300, which may be area of empty space for control seal 200 to expand into. For example, enclosure 130 may include target area 300 such that the gas within battery pack 102 flows through inner portion 202 into gap portion 204, control seal 200 unfolds and expands into target area 300 (FIG. 9). Target area 300 may be located along the X-axis of battery pack 102, adjacent to battery pack 102 and/or battery 112. In some implementations, gap portion 204 allows the pressure within interior space 114 and battery pack 102 to decrease. For example, once inner portion 202 breaks open and gas flows into gap portion 204, the pressure within interior space 114 and battery pack 102 may begin to decrease due to the increase in area that the gas can flow towards.

Referring to FIG. 9, when battery 112 degrades and releases gas, battery pack 102 may begin to expand. Interior space 114 of battery pack 102 may to fill up with gas resulting in battery pack 102 expanding along its Z-axis until it abuts enclosure 130. Once battery pack 102 abuts or contacts enclosure 130, the increase in gas increases the pressure within battery pack 102 resulting in sealing layer 120 of inner portion 202 failing and breaking open since the pressure threshold of sealing layer 120 of inner portion 202 is less than the pressure threshold of enclosure 130. In some implementations, outer portion 206 remains intact, thereby preventing any further flow of gas to the outside environment and/or into enclosure 130 due to sealing layer 120 of outer portion 206 having a pressure threshold greater than the pressure threshold of inner portion 202.

Figure 10A:
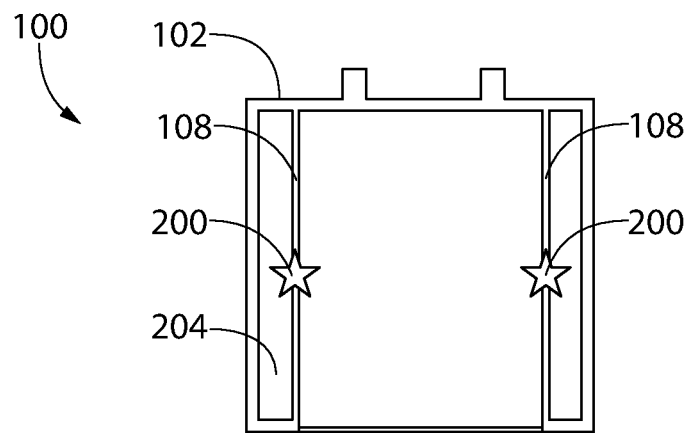
FIGS. 10A-10C are top views of battery packs with control seals disposed at various locations in accordance with some implementations of the present invention.
Figure 10B:
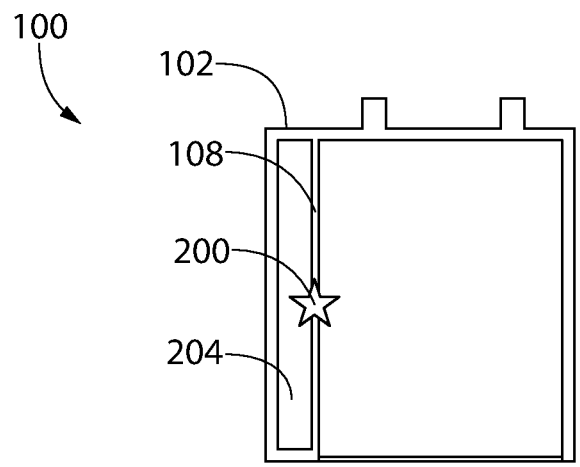
Figure 10C:
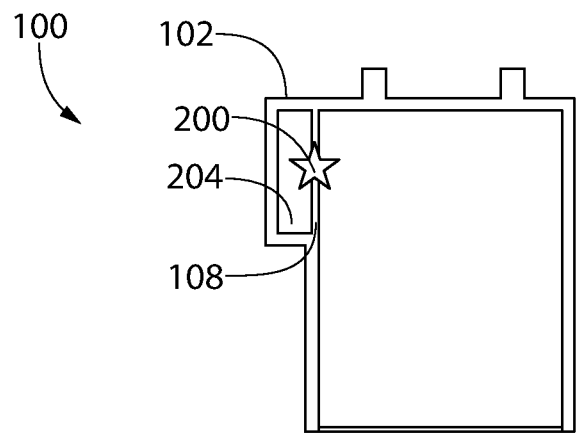

Referring to FIGS. 10A-10C, battery expansion control system 100 may control the direction of swelling of battery pack 102 using control seal 200 and gap portion 204. For example, battery pack 102 may include one or more control seals 200 disposed at various locations of battery pack 102 such that gap portion 204 allows battery pack 102 to expand into specific areas. For example, battery pack 102 may include control seal 200 and gap portion 204 on both sides adjacent to both side walls 108 (FIG. 9A) or may include control seal 200 and gap portion 204 adjacent only one side wall 108 (FIG. 9B). Control seal 200 and gap portion 204 may be disposed at specific locations along battery pack 102 based on the spacing available within enclosure 130. For example, battery pack 102 may include control seal 200 and gap portion 204 in an upper corner adjacent side wall 108 and top seal 109 (FIG. 9C). However, battery pack 102 may include control seal 200 and gap portion 204 at any location desired to control the swelling of battery pack 102.

Figure 11A:
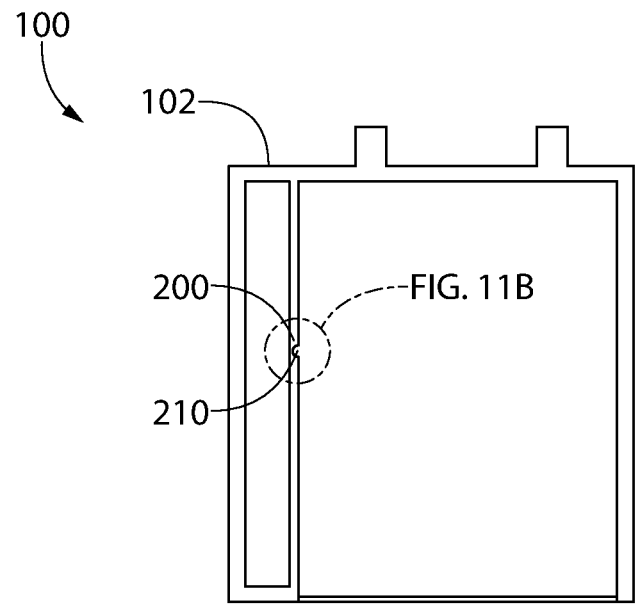
FIGS. 11A-11B is a top view of a battery pack with a control seal having a notch in accordance with some implementations of the present invention.
Figure 11B:
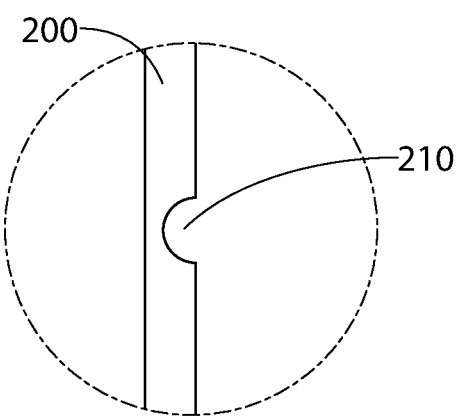

Referring to FIG. 11A-11B, control seal 200 may include notch 210 disposed at inner portion 202. Notch 210 may weaken inner portion 202 resulting in inner portion 202 having a decreased pressure threshold. Notch 210 may allow for the adjustment and control of the failure point of sealing layer 120 of inner portion 202. For example, notch 201 may be located at specific location along inner portion 202 of control seal 200 resulting in the inner portion 202 being weaker at the location of notch 210 than the rest of control seal 200. The weaker location of inner portion 202 due to notch 210 may determine where inner portion 202 fails from the pressure of gas within battery pack 102. In some implementations, notch 210 controls where inner portion 202 fails and where gap portion 204 begins to fill with gas from battery pack 102.

Figure 11C:
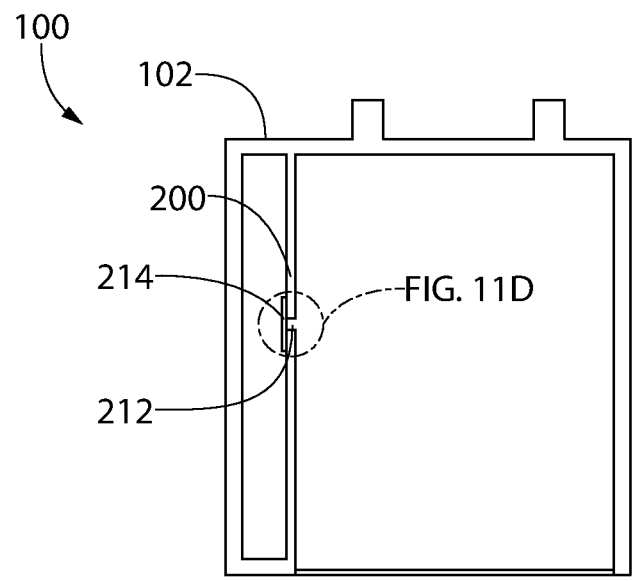
FIGS. 11C-11D is a top view of a battery pack with a control seal having an aperture and mesh in accordance with some implementations of the present invention.
Figure 11D:
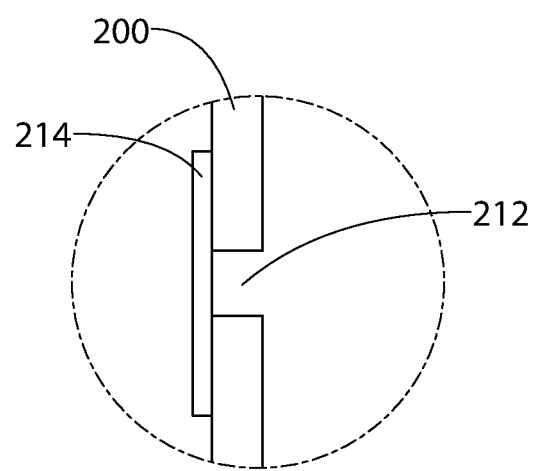

Referring to FIG. 11C-11D, control seal 200 may include aperture 212. Similar to notch 210, aperture 212 may allow for the adjustment and control of the failure point of sealing layer 120 of inner portion 202. Aperture 212 may be disposed within inner portion 202 to allow any gas generated within battery pack 102 to freely flow into gap portion 204. In some implementations, control seal 200 includes mesh 214 disposed between gap portion 204 and aperture 212. Mesh 214 may be a mesh configured to prevent the electrolyte within battery 112 from entering gap portion 204. In some implementations, mesh 214 is an oleophobic mesh or a hydrophobic mesh.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A battery pack comprising:
a battery;
an outer enclosure that houses the battery, the outer enclosure defining at least three axes for the battery pack; and
a control seal that extends from the outer enclosure in a respective axis of the at least three axes, the control seal having a sealing layer that is configured to provide an air-tight seal for an interior space and the battery, the control seal comprising:
an inner portion having a first sealing layer;
an outer portion having a second sealing layer, the inner portion positioned proximally closer to the battery than the outer portion consistent with the respective axis with which the control seal extends; and
a gap portion positioned between the inner portion and the outer portion, the gap portion being devoid of a sealing layer, the gap portion configured to receive fluid from the interior space when a pressure exerted on the first sealing layer exceeds a pressure threshold sufficient to cause the outer enclosure to expand primarily along the respective axis with which the control seal extends to suppress expansion along an axis perpendicular to the respective axis.

2. The battery pack of claim 1, wherein the at least three axes correspond to a length, a width, and a height, respectively, of the battery pack.

3. The battery pack of claim 2, wherein:
the respective axis of the at least three axes corresponds to a width of the battery pack; and
the outer enclosure is configured to expand in the direction consistent with the width of the battery pack.

4. The battery pack of claim 1, wherein:
the battery pack comprises two or more control seals that extend from the outer enclosure in two or more respective axes of the at least three axes; and
the outer enclosure is configured to expand in two or more directions consistent with the two or more respective axes with which the two or more control seals extend.

5. The battery pack of claim 1, wherein the inner portion includes at least one of an oleophobic mesh or a hydrophobic mesh.

6. The battery pack of claim 1, wherein:
a length of the gap portion and a length of the inner portion is consistent with the respective axis with which the control seal extends; and
the length of the gap portion is greater than the length of the inner portion.

7. The battery pack of claim 1, wherein the pressure threshold is less than 1000 Kilopascals (kPa).

8. The battery pack of claim 1, wherein:
the outer enclosure defines one or more geometric faces; and
the control seal is folded adjacent to a respective geometric face of the one or more geometric faces.

9. The battery pack of claim 1, wherein the outer enclosure and the control seal include a plurality of layers, the plurality of layers comprising at least one of a nylon layer, an aluminum layer, a polypropylene layer, or a thermoplastic layer.

10. The battery pack of claim 1, wherein:
the interior space is a region between the battery and the outer enclosure; and
the inner portion is disposed between the gap portion and at least one of the battery or the interior space.

11. An electronic device comprising:
one or more electrically-powered components;
an internal cavity; and
a battery pack configured to power at least one of the one or more electrically-powered components, the battery pack disposed with the internal cavity such that a portion within the internal cavity comprises empty space, the battery pack comprising:
a battery;
an outer enclosure that houses the battery, the outer enclosure defining at least three axes for the battery pack; and
a control seal that extends from the outer enclosure in a respective axis of the at least three axes towards the empty space in the internal cavity, the control seal having a sealing layer that is configured to provide an air-tight seal for an interior space and the battery, the control seal comprising:
an inner portion having a first sealing layer;
an outer portion having a second sealing layer, the inner portion positioned proximally closer to the battery than the outer portion consistent with the respective axis with which the control seal extends; and
a gap portion positioned between the inner portion and the outer portion, the gap portion being devoid of a sealing layer, the gap portion configured to receive fluid from the interior space when a pressure exerted on the first sealing layer exceeds a pressure threshold sufficient to cause the outer enclosure to expand primarily along the respective axis with which the control seal extends to suppress expansion along an axis perpendicular to the respective axis.

12. The electronic device of claim 11, wherein the at least three axes correspond to a length, a width, and a height, respectively, of the battery pack.

13. The electronic device of claim 12, wherein:
the respective axis of the at least three axes corresponds to a width of the battery pack, the width of the battery pack being dimensionally larger than a height and a length of the battery pack; and
the outer enclosure is configured to expand in the direction consistent with the width of the battery pack.

14. The electronic device of claim 11, wherein:
the battery pack comprises two or more control seals that extend from the outer enclosure in two or more respective axes of the at least three axes; and
the outer enclosure is configured to expand in two or more directions consistent with the two or more respective axes with which the two or more control seals extend.

15. The electronic device of claim 11, wherein the inner portion includes at least one of an oleophobic mesh or a hydrophobic mesh.

16. The electronic device of claim 11, wherein:
a length of the gap portion and a length of the inner portion is consistent with the respective axis with which the control seal extends; and
the length of the gap portion is greater than the length of the inner portion.

17. The electronic device of claim 11, wherein the pressure threshold is less than 1000 Kilopascals (kPa).

18. The electronic device of claim 11, wherein:
the outer enclosure defines one or more geometric faces; and
the control seal is folded adjacent to a respective geometric face of the one or more geometric faces.

19. The electronic device of claim 11, wherein the outer enclosure and the control seal include a plurality of layers, the plurality of layers comprising at least one of a nylon layer, an aluminum layer, a polypropylene layer, or a thermoplastic layer.

20. The electronic device of claim 11, wherein:
the interior space is a region between the battery and the outer enclosure; and
the inner portion is disposed between the gap portion and at least one of the battery or the interior space.

* * * * *